United States Patent
Feno

(10) Patent No.: US 9,837,920 B2
(45) Date of Patent: Dec. 5, 2017

(54) COMMUTATION CURRENT STEERING METHOD IN A ZERO VOLT SWITCHING POWER CONVERTER USING A SYNCHRONOUS RECTIFIER

(71) Applicant: Power-One, Inc., Camarillo, CA (US)

(72) Inventor: Ivan Feno, Bertschikon (CH)

(73) Assignee: Bel Power Solutions, Inc., Santa Clara, CA (US)

( * ) Notice: Subject to any disclaimer, the term of this patent is extended or adjusted under 35 U.S.C. 154(b) by 92 days.

(21) Appl. No.: 14/231,797

(22) Filed: Apr. 1, 2014

(65) Prior Publication Data

US 2015/0092450 A1    Apr. 2, 2015

Related U.S. Application Data

(60) Provisional application No. 61/883,294, filed on Sep. 27, 2013.

(51) Int. Cl.
*H02M 3/335* (2006.01)
*H02M 1/00* (2006.01)

(52) U.S. Cl.
CPC ........ *H02M 3/33592* (2013.01); *H02M 3/335* (2013.01); *H02M 3/33507* (2013.01); *H02M 3/33569* (2013.01); *H02M 3/33576* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ........ H02M 3/33507; H02M 3/33576; H02M 3/33569; H02M 3/33592

USPC .......................................................... 363/17
See application file for complete search history.

(56) References Cited

U.S. PATENT DOCUMENTS

| | | |
|---|---|---|
| 6,650,552 B2 | 11/2003 | Takagi et al. |
| 6,888,728 B2 | 5/2005 | Takagi et al. |
| 8,098,500 B2 | 1/2012 | Heo et al. |

(Continued)

FOREIGN PATENT DOCUMENTS

| | | |
|---|---|---|
| EP | 1261122 A2 | 11/2002 |
| KR | 1020100004620 A | 1/2010 |

OTHER PUBLICATIONS

International Search Report in corresponding International Application No. PCT/US2014/057690, dated Dec. 22, 2014, 3 pp.

*Primary Examiner* — Fred E Finch, III
*Assistant Examiner* — Rafael O De Leon Domenech
(74) *Attorney, Agent, or Firm* — Patterson Intellectual Property Law, P.C.; Mark J. Patterson; Gary L. Montle

(57) ABSTRACT

A commutation current steering method is provided for a power converter having an isolation transformer, a plurality of primary ZVS switches, a plurality of secondary switches for synchronous rectification, and a boosting resonant circuit. A commutation current is shared between all of the switches, and a resonance is induced in the boosting resonant circuit by controlling each of the synchronous rectifier switches to turn off at a time prior to a turn-off time for a corresponding one of the switches operating under ZVS conditions, wherein the primary current is boosted above a minimum commutation value during ZVS periods. The ZVS switches are further driven with a constant dead time, and the synchronous rectifier switches are driven to provide a fixed time relation with respect to all of the switches.

12 Claims, 4 Drawing Sheets

(56) References Cited

U.S. PATENT DOCUMENTS

| | | | |
|---|---|---|---|
| 8,199,530 B2 * | 6/2012 | Sase | H02M 3/33576 363/17 |
| 8,717,783 B2 * | 5/2014 | Wang | H02M 3/33592 363/17 |
| 2002/0172061 A1 | 11/2002 | Phadke | |
| 2007/0211500 A1 | 9/2007 | Leung et al. | |
| 2009/0097280 A1 * | 4/2009 | Wu | H02M 3/33592 363/17 |
| 2009/0244934 A1 * | 10/2009 | Wang | H02M 3/33592 363/21.06 |

* cited by examiner

US 9,837,920 B2

COMMUTATION CURRENT STEERING METHOD IN A ZERO VOLT SWITCHING POWER CONVERTER USING A SYNCHRONOUS RECTIFIER

CROSS-REFERENCES TO RELATED APPLICATIONS

This application claims benefit of U.S. Provisional Patent Application No. 61/883,294, filed Sep. 27, 2013, which is/are hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to the field of electrical power conversion, and more particularly to soft switched power converters equipped with synchronous rectification. Even more particularly, the present invention relates to zero voltage switching (ZVS) power conversion implementing a commutation current boosting method.

Soft switched power converters, such as those configured for switching at zero voltage (ZVS), are popular for their relatively low switching losses and smooth switching waveforms, providing high efficiency and good electromagnetic compatibility (EMC). One of the parameters to be calculated during design of such converters is a level of commutation energy required to maintain zero volt switching. This minimum level of commutation energy can be calculated based on parasitic elements in the circuit design. From this calculation, a value for the minimum amplitude of the commutation current can be obtained. This current introduces an internal reactive power constantly circulating throughout the converter, and is responsible for a remarkable degree of power losses. These losses further result in lower efficiency, especially at the lower half of the load range.

Therefore, designers try to minimize the level of the commutation current, so as to offer a smaller reactive energy circulating in power circuits of the converter and also resulting in a smaller permanent power loss and higher efficiency. Unfortunately, a smaller commutation current also notably reduces ZVS reliability.

One previously known method for addressing this problem involves implementing a variable dead time in combination with a variable phase shift between primary and secondary control signals generated by a controller, thereby ensuring that power switching elements are not exposed to cross conduction or non-ZVS operation across the range of operating conditions. This approach, unfortunately, brings about additional demands on the controller, ultimately resulting in any or all of a more expensive, more complex or lower performing control solution.

Conventional power converters further typically enable or disable synchronous rectifier switches as a function of the load current. One problem with this technique is that it may cause dips on the output voltage, which can be critical for applications requiring tight output voltage regulation. The need for current sensing in order to provide proper synchronous rectifier control further requires a more demanding design.

BRIEF SUMMARY OF THE INVENTION

In an exemplary embodiment, a zero volt switching LLC-type power converter and method are provided for converting power from an input DC voltage source to a variable load. A first plurality of switches operate under ZVS conditions, a second plurality of switches operate as a synchronous rectifier, and a resonant tank is further provided, wherein one or more components of the converter at least partially define a minimum current outside ZVS commutation periods and one or more parasitic components at least partially define a maximum current during ZVS commutation periods while converter is operated under light or zero load conditions.

A boosting resonance is induced by controlling each of the synchronous rectifier switches to turn off at a time prior to a turn-off time for a corresponding one of the switches operating under ZVS conditions. The boosting resonance derives a commutation current boosting effect, which yields to faster and more reliable ZVS conditions for the ZVS operated switches.

In one exemplary aspect of a power converter as described herein, the synchronous rectifier switches are operated across an entire output current range. In another aspect, the synchronous rectifier switches are operated across an entire input voltage range.

In another aspect, the switches operating under ZVS conditions are driven with a constant dead time.

In another aspect, the synchronous rectifier switches are driven to provide a constant phase shift between the switches operating under ZVS conditions and the synchronous rectifier switches.

In yet another aspect, the LLC-type converter includes a resonant capacitor, and primary and secondary leakage inductances of an isolation transformer, and may further include a resonant choke. A ratio between a primary magnetizing inductance of the isolation transformer and an inductance of the resonant choke is substantially increased because of a reduced commutation current, and may preferably be greater than seven. The smaller commutation current offers a smaller reactive energy circulating in the power circuits of the converter, which may generally result in a smaller permanent power loss and higher overall efficiency.

In still another aspect, the switches operating under ZVS conditions are primary-side switches with respect to the isolation transformer and the synchronous rectifier switches are secondary-side switches with respect to the isolation transformer.

DETAILED DESCRIPTION OF THE INVENTION

Figure 1:
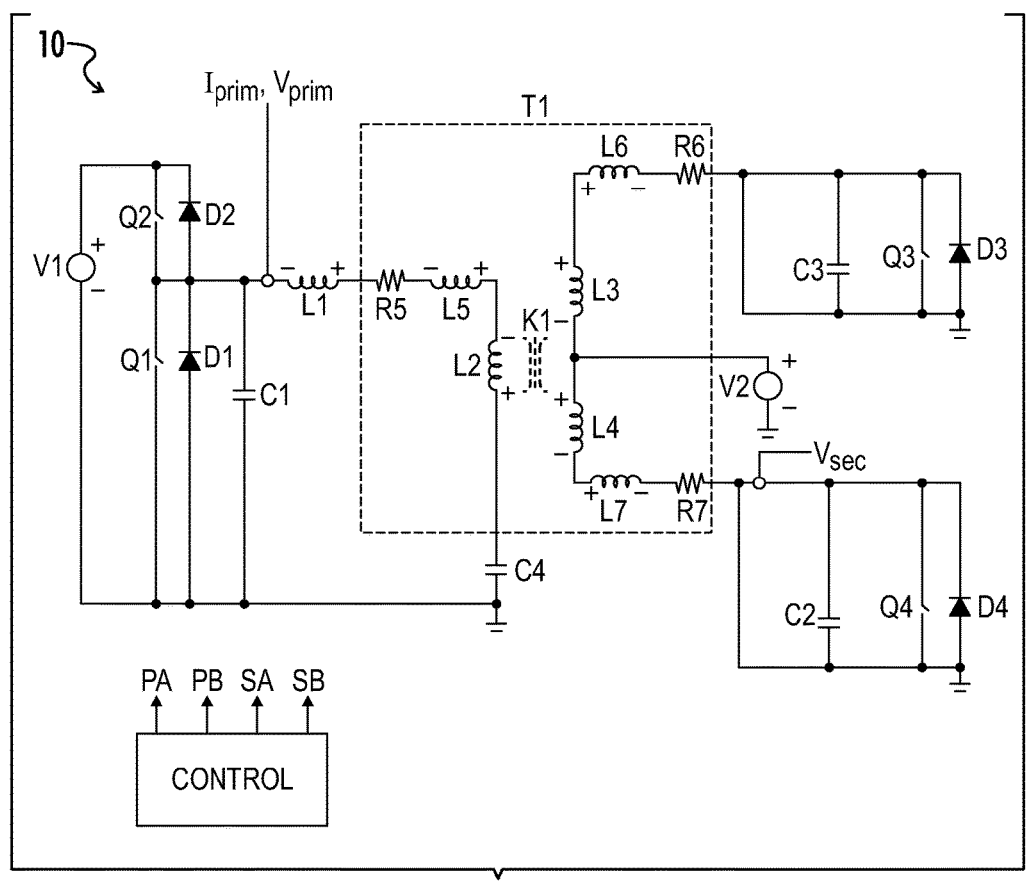
FIG. 1 is a circuit diagram representing a circuit model of a power converter used to describe an embodiment of a method of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge, series resonant converter, parallel resonant converter, LLC converter or various other forms of power conversion or inversion as known to one of skill in the art.

The terms "controller," "control circuit" and "control circuitry" as used herein may refer to processing circuitry including one or more of a general microprocessor, an application specific integrated circuit (ASIC), a digital signal processor (DSP), a digital signal controller (DSC), a microcontroller, a field programmable gate array (FPGA), and/or various alternative blocks of discrete processing circuitry, and any pre-processing modules or other such circuitry as may be designed as is known in the art to perform functions as further defined herein. In an embodiment of the present invention the controller may be formed of processing circuitry and program instructions or firmware which is integrally embodied therewith. In other embodiments, the processing circuitry may be separately embodied but functionally linked to a processor-readable medium having program instructions or firmware residing thereon and which is executable by the processor to perform functions as further defined herein.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring generally to FIGS. 1-6, a power converter and associated methods may now be described. Where the various figures may describe embodiments sharing various common elements and features with other embodiments, similar elements and features are given the same reference numerals and redundant description thereof may be omitted below.

Briefly stated, an exemplary commutation current steering method according to embodiments of the present disclosure is provided in the context of a zero volt switched (ZVS) power converter. The commutation current is forced to flow through at least a primary circuit branch and a secondary circuit branch with respect to an isolation transformer (and consequently through switches operating in ZVS conditions and switches operating as synchronous rectifiers) by keeping the operation of the synchronous rectifier switches enabled eventually down to zero load. By doing this, the power losses associated with the commutation current are reduced since both of the switches operating under ZVS conditions and the switches operating as synchronous rectifiers share the commutation current in their respective on-states.

A modification in the timing of the synchronous rectifier control signals further essentially steers the commutation current from the secondary side to the primary side of the isolation transformer, providing more commutation energy for proper ZVS operation of the switches operating in ZVS conditions. This is achieved by inducing a boosting resonance which is triggered by an early turn-off of the synchronous rectifier switch with respect to the otherwise corresponding turn-off instant for the switches operating in ZVS conditions.

The above-referenced method may be more particularly demonstrated in accordance with a simplified LLC converter simulation model 10 as shown in FIG. 1. The simulation model of FIG. 1 may represent certain elements as discrete components, although one of skill in the art may appreciate that such elements in practice may in the alternative be intrinsically embedded in another component or element. Elements Q1/D1 and Q2/D2 represent first and second primary-side switching devices operating in ZVS conditions, C1 represents a parasitic capacitance of the switching elements Q1 and Q2, L1 is a resonant choke and capacitor C4 is a resonant capacitor. L2-L4 represent primary and secondary-side magnetizing inductances for a transformer T1, and L5-L7 represent primary and secondary-side isolation transformer leakage inductances. A resonant tank of the LLC converter is formed by C4, L1 and includes also L5-L6 or L5-L7, respectively. In case L1 is not present, only L5-L6 or L5-L7 respectively forms inductive part of the resonant tank. Q3/D3/C3 and Q4/D4/C2 represent secondary-side switching devices as synchronous rectifier switches. An exemplary load is represented by voltage source V2 while V1 represents an input voltage source.

Figure 2:
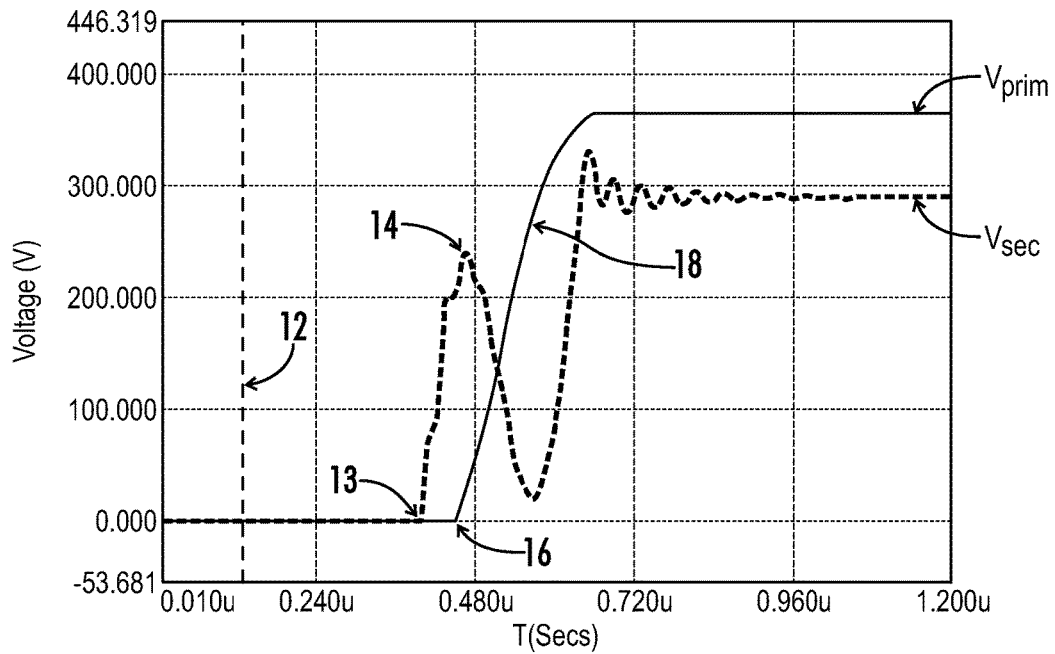
FIG. 2 is a graphical diagram representing exemplary voltage waveforms for operation according to an embodiment of a method of the present invention.
Figure 3:
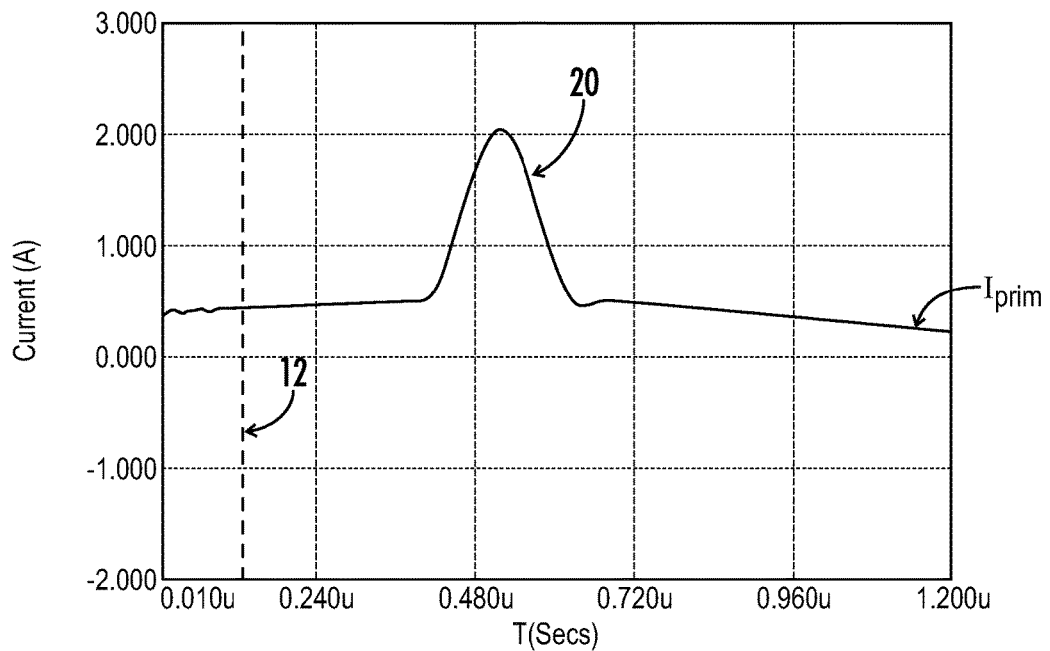
FIG. 3 is a graphical diagram representing exemplary current waveforms for operation according to an embodiment of a method of the present invention.

Referring also now to FIGS. 2 and 3, in an embodiment of the method a magnetizing current generated by magnetizing inductance L2-L3-L4 is simultaneously also the commutation current providing ZVS for the primary switches. Whenever operation of the synchronous rectifier switches is enabled, the commutation current is shared between the primary switches and the synchronous rectifier switches. Therefore, at the time instant 12 the commutation current flows through switching elements Q1 and Q4. Before the switching element Q1 commutates to switching element Q2, the synchronous rectifier switch Q4 is first turned off at point 13, forcing a parasitic capacitance C2+C3 of the switching elements Q3 and Q4 to resonate with the total transformer leakage (L5+L6∥L7) and the resonant choke L1. Therefore a boosting resonant circuit is formed by L1+L5+(L6∥L7) and C2+C3. In case the resonant choke L1 is not present, L1=0. The magnetizing inductances do not play a role in this resonance because the high impedance acts as a current source.

During this time, the voltage on the synchronous rectifier switch Q4 rises and falls to form a resonant period 14. At the same time, the current through secondary leakage inductance L7 falls to zero, reverses to negative value, and returns back to original value. The current through secondary leakage inductance L7 is fully reflected to the primary side and forms a boosting resonant wave 20 that increases the primary commutation current. During the time of resonance the primary switching element Q1 is turned off at point 16 and while the commutation current is boosted as described above, the commutation of switches Q1, Q2 forms a fast and reliable ZVS transition 18. As a result, ZVS commutation of the primary switches Q1, Q2 can further be maintained during no-load conditions while the converter can be designed with larger magnetizing inductance and/or constant dead times. Power losses associated with the commutation current are substantially reduced, as all of the aforementioned switching elements Q1, Q2, Q3, Q4 share the commutation current during most of the time.

Figure 4:
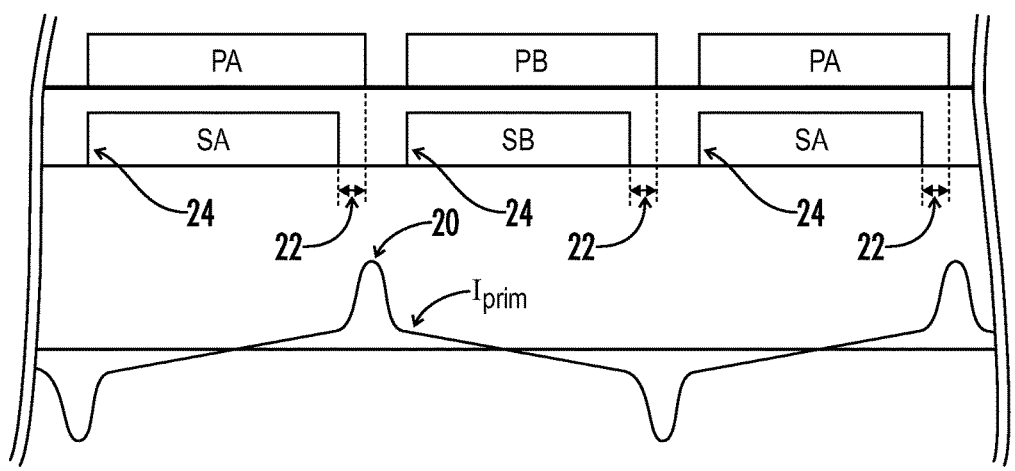
FIG. 4 is a timing diagram representing control pulses driving an exemplary power converter model of FIG. 1, further in accordance with a method as related in FIGS. 2 and 3.

Referring now to FIG. 4, primary and secondary control pulses are illustrated driving the power stage according to the simplified model of a LLC-type resonant converter of FIG. 1. A controller for generating the control pulses may in various embodiments be either of an analog controller or a digital controller without altering the scope of the present invention.

Pulses PA and PB control the respective switching elements Q1 and Q2 operating in ZVS conditions. Pulses SA and SB drive the respective synchronous rectifier switches Q3 and Q4. The synchronous rectifier switching elements Q3, Q4 are switched off in advance of the switch-off time for corresponding ZVS switching elements Q1, Q2 by an advance time 22. Alternatively stated, the switches Q1, Q2 are controlled to be turned off after a delay time 22 with respect to the respective turn-off time for corresponding switches Q3, Q4. This advance or delay 22 results in the aforementioned resonance condition and causes the boost 20 in the primary-side current Iprim flowing through switching elements Q1, Q2 as described above. Note that the position of leading pulse edges 24 are here aligned for each of pulse signals PA and PB, respectively, but the exact position depends on how the synchronous rectifier drivers are designed. Therefore, any positive or negative time shift of the leading pulse edges 24 may fall within the scope of the present invention.

In an embodiment of the apparatus and method, FETs with highly non-linear Coss may be implemented as switching elements for the converter topology 10, combined with relatively large magnetizing inductance of the isolation transformer and still achieving ZVS across the entire load and input voltage range, resulting in a relatively small commutation current being reflected to the primary side with respect to the boost wave 20 induced by the corresponding resonance condition. As a result, the primary switch commutation is relatively short despite the strong Superjunction Coss nonlinearity which is remarkable only at the end of the transition. Therefore, the boost wave 20 assures that the voltage across the switch can go down to zero volt despite of the large capacitance increase of Coss in this region and hence enables operation of the converter with constant dead time and constant phase shift in the primary-to-secondary control signals across the entire load and input voltage range.

Because various embodiments of a method as described herein allow for operation of a power converter 10 with small commutation current, it may further be noted that a high ratio between the primary magnetizing inductance and the inductance of the resonant choke can be achieved, thereby increasing the efficiency of the converter.

Figure 5:
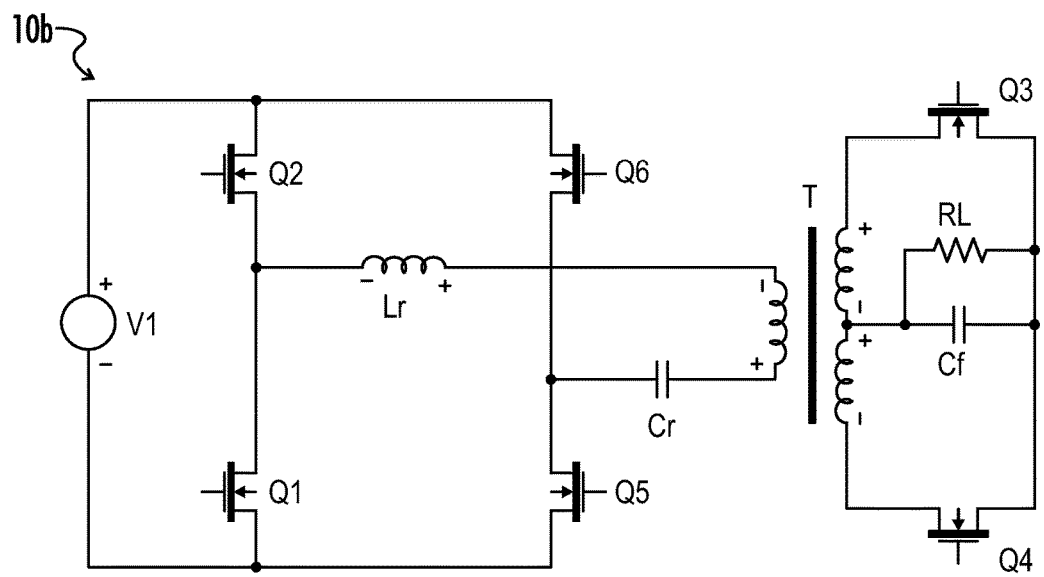
FIG. 5 is an exemplary full bridge converter according to an embodiment of the present invention
Figure 6:
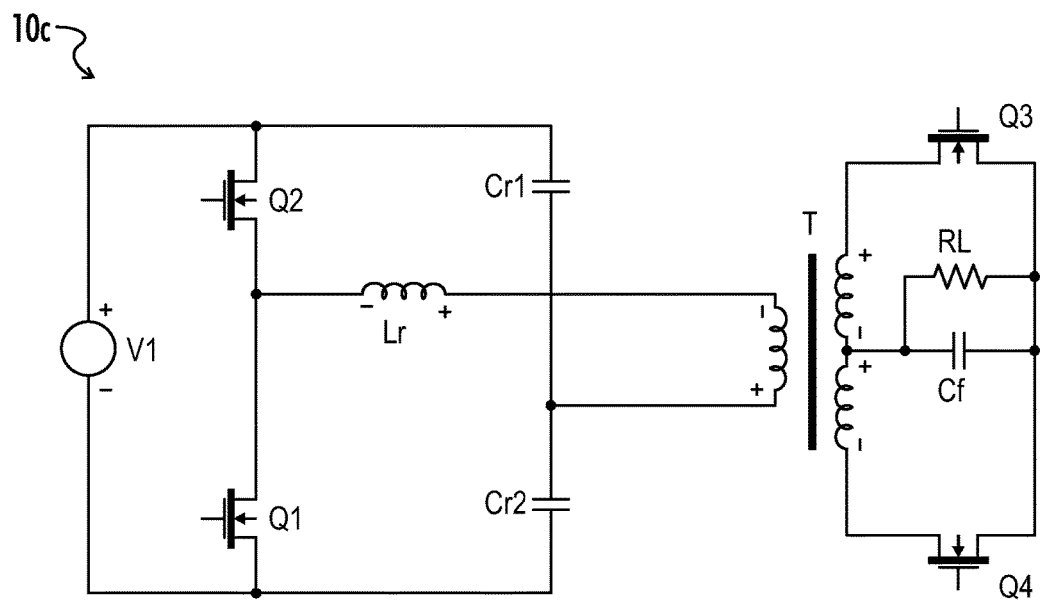
FIG. 6 is an exemplary half-bridge converter according to an embodiment of the present invention.

FIG. 5 shows a full bridge and FIG. 6 shows a half bridge LLC-type of converter (10b and 10c, respectively) operated according to an embodiment of the invention and characterized with ratio between magnetizing inductance of isolation transformer T and resonant inductance Lr larger than 7. Both converters 10b, 10c are supplied from input voltage source V1 and supplies converted power to a load RL.

The previous detailed description has been provided for the purposes of illustration and description. Thus, although there have been described particular embodiments of an invention herein, it is not intended that such references be construed as limitations upon the scope of this invention except as set forth in the following claims.

What is claimed is:

1. A method of converting power from an input DC voltage source to a variable load, in a zero volt switching (ZVS) converter having a plurality of switches operating under ZVS conditions, a plurality of switches operating as a synchronous rectifier, an isolation transformer, and a resonant circuit comprising a leakage inductance of the isolation transformer and a parasitic Coss capacitance for each of the plurality of synchronous rectifier switches, the method comprising:

sharing a commutation current between the switches operating under ZVS conditions and the synchronous rectifier switches, controlling each of the synchronous rectifier switches to turn on concurrently with a turn-on time for a corresponding one of the switches operating under ZVS conditions, and controlling each of the synchronous rectifier switches to turn off at a fixed time in advance of a turn-off time for the corresponding one of the switches operating under ZVS conditions, wherein the parasitic Coss capacitances are forced to resonate with the leakage inductance and a boosting resonant wave is formed in a current flowing through the ZVS converter switches during ZVS transitions by a current through the leakage inductance of the isolation transformer being reflected to a primary side of the converter.

2. The method of claim 1, further comprising operating the synchronous rectifier switches across an entire input voltage range.

3. The method of claim 1, further comprising driving the switches operating under ZVS conditions with a constant dead time.

4. The method of claim 3, wherein a ratio between a primary magnetizing inductance of the isolation transformer and an inductance of a resonant choke of the ZVS converter is greater than 7.

5. The method of claim 4, wherein the ZVS converter is a resonant converter.

6. The method of claim 1, wherein the switches operating under ZVS conditions are primary-side switches with respect to the isolation transformer and the synchronous rectifier switches are secondary-side switches with respect to the isolation transformer.

7. A zero volt switching (ZVS) power converter comprising:
- a first plurality of switches configured to operate under ZVS conditions;
- a second plurality of switches configured to operate as a synchronous rectifier;
- an isolation transformer;
- a resonant circuit comprising a leakage inductance of the isolation transformer and a parasitic Coss capacitance for each of the plurality of synchronous rectifier switches; and
- control circuitry defining a controller that is configured to generate control signals to operate each of the switches, whereby the controller is functional to
  - operate the synchronous rectifier switches wherein a commutation current is shared between the switches operating under ZVS conditions and the synchronous rectifier switches,
  - control each of the synchronous rectifier switches to turn on at the same time as a turn-on time for a corresponding one of the switches operating under ZVS conditions, and
  - control each of the synchronous rectifier switches to turn off at a fixed time in advance of a turn-off time for the corresponding one of the switches operating under ZVS conditions, wherein the parasitic Coss capacitances are forced to resonate with the leakage inductance and a boosting resonant wave is formed in a current flowing through the first plurality of switches during ZVS transitions by a current through the leakage inductance of the isolation transformer being reflected to a primary side of the converter.

8. The power converter of claim 6, wherein the controller is further configured to operate the synchronous rectifier switches across an entire input voltage range.

9. The power converter of claim 6, wherein the controller is further configured to drive the switches operating under ZVS conditions with a constant dead time.

10. The power converter of claim 6, wherein the zero volt switching (ZVS) power converter is a resonant converter.

11. The power converter of claim 6, wherein the switches operating under ZVS conditions are primary-side switches with respect to the isolation transformer and the synchronous rectifier switches are secondary-side switches with respect to the isolation transformer.

12. The power converter of claim 10, wherein a ratio between a primary magnetizing inductance of the isolation transformer and an inductance of the resonant choke of said resonant converter is greater than 7.

\* \* \* \* \*